United States Patent
Overdick et al.

(10) Patent No.: US 7,381,956 B2
(45) Date of Patent: Jun. 3, 2008

(54) DETECTOR ELEMENT FOR SPATIALLY RESOLVED DETECTION OF GAMMA RADIATION

(75) Inventors: Michael Overdick, Langerwehe (DE); Augusto Nascetti, Aachen (DE); Herfried Karl Wieczorek, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 80 days.

(21) Appl. No.: 10/554,342

(22) PCT Filed: Apr. 13, 2004

(86) PCT No.: PCT/IB2004/050420

§ 371 (c)(1),
(2), (4) Date: Oct. 24, 2005

(87) PCT Pub. No.: WO2004/095068

PCT Pub. Date: Nov. 4, 2004

(65) Prior Publication Data

US 2006/0243913 A1   Nov. 2, 2006

(30) Foreign Application Priority Data

Apr. 24, 2003   (EP)   .................................. 03101128

(51) Int. Cl.
*G01T 1/20* (2006.01)

(52) U.S. Cl. ................... 250/361 R; 250/367; 250/362

(58) Field of Classification Search ............... 250/367, 250/361 R, 362
See application file for complete search history.

(56) References Cited

U.S. PATENT DOCUMENTS

| 4,398,092 | A | | 8/1983 | Carlson |
| 4,677,299 | A | * | 6/1987 | Wong ..................... 250/363.03 |
| 5,122,667 | A | | 6/1992 | Thompson |
| 5,124,545 | A | * | 6/1992 | Takanashi et al. ..... 250/214 LA |
| 5,138,167 | A | | 8/1992 | Barnes |
| 5,317,158 | A | | 5/1994 | McElhaney et al. |
| 5,451,793 | A | * | 9/1995 | Boone ...................... 250/486.1 |
| 5,841,833 | A | * | 11/1998 | Mazess et al. ............. 378/98.9 |
| 6,194,728 | B1 | | 2/2001 | Bosnjakovic |
| 6,285,740 | B1 | * | 9/2001 | Seely et al. ................ 378/98.9 |
| 6,288,399 | B1 | | 9/2001 | Andreaco et al. |
| 6,362,479 | B1 | | 3/2002 | Andreaco et al. |
| 6,445,765 | B1 | * | 9/2002 | Frank et al. .................. 378/56 |
| 6,570,160 | B1 | * | 5/2003 | Maekawa et al. ........... 250/367 |
| 2002/0195565 | A1 | * | 12/2002 | Lecoq ................... 250/363.03 |

* cited by examiner

*Primary Examiner*—David P. Porta
*Assistant Examiner*—Djura Malevic

(57) ABSTRACT

The invention relates to a detector element (1) for gamma radiation, which is particularly suitable for use in a PEF apparatus. The detector element (1) consists of two or more different conversion units (11, 12), which react to the absorption of a gamma quantum (y) with light emissions ($\lambda_1$, $\lambda_2$) of different spectral composition. A photodetector arrangement (30) may therefore discriminate between the sites of origin of the light emissions by means of their spectral characteristics.

20 Claims, 4 Drawing Sheets

DETECTOR ELEMENT FOR SPATIALLY RESOLVED DETECTION OF GAMMA RADIATION

The invention relates to a detector element for detecting radiation quanta, in particular gamma quanta. It also relates to a device for generating images from the gamma quanta detected, which device may in particular be a PET apparatus. Finally, the invention relates to a method of detecting radiation quanta.

A detector is known from U.S. Pat. No. 6,362,479 B1, in which conversion elements (scintillators) are arranged next to one another in the manner of an array for two-dimensional spatially resolved detection of gamma quanta. Furthermore, each individual conversion element is constructed from two different material layers when viewed in the direction of radiation incidence, wherein the absorption of gamma quanta in the various layers leads in each case to light emissions with different temporal pulse shapes. Photodetectors connected to the conversion elements may therefore detect by means of the pulse shape of a light emission, in which of the layers absorption of a gamma quantum has taken place. Such a detector may in particular be used in a PET apparatus (PET: Positron Emission Tomography), in order to improve the imaging accuracy thereof by taking into account the depth of interaction (DOI). The depth of interaction describes the position, measured from the apparatus axis, in a detector element at which conversion of a gamma quantum into a light emission has taken place. However, a disadvantage of the known detector is that reliable discrimination between the pulse shapes of light emissions is relatively demanding with regard to time analysis of the signals. In addition, the light emissions have to consist of a sufficiently large number of photons, so that clear detection of a pulse shape is possible.

Against this background, it was an object of the present invention to provide means for spatially resolved detection of radiation quanta with which an increase in imaging accuracy is possible in a PET apparatus in particular in a simple and reliable manner.

This object is achieved with a detector element having the features of claim 1, with a device having the features of claim 9, and with a method having the features of claim 10. Advantageous developments are contained in the dependent claims.

The detector element according to the invention serves to detect radiation quanta. These may in particular be gamma quanta, which may originate, for example, in a PET apparatus from the process of annihilation of a positron with an electron. The detector element comprises substantially two components:

a) a conversion arrangement, which is set up so as to absorb quanta of the radiation to be detected and in each case convert them into a light emission consisting of quanta of another wavelength. As the unrestrictedly general term "light emission" indicates, the above-mentioned other wavelength may be in particular a visible light wavelength. The spectral composition (wavelength distribution) of the light emission produced by an absorbed radiation quantum is intended additionally to depend on the site of origin of the light emission within the conversion arrangement. In other words, at least two different sites need to be provided within the conversion arrangement, at which light emissions of different spectral composition arise if a radiation quantum is absorbed there.

b) a photodetector arrangement, which is set up so as to detect the above-mentioned light emissions from the conversion arrangement resulting from absorption of a radiation quantum and to discriminate between them with regard to their spectral characteristics. "Detection" of a light emission may cover in particular simple (binary) detection of the existence of the light emission, the time or the duration of the light emission and/or the amplitude or amplitude profile of the light emission. Such detection variables are required, in a PET apparatus for example, in order to detect the coincidence of gamma quanta of a particular energy level. Furthermore, the photodetector arrangement is intended also to be in a position to discriminate between light emissions with regard to their spectral characteristics. A spectral characteristic may, for example, include the entire spectral composition of a light emission (i.e. intensity as a function of wavelength) or only characteristic features of the spectrum (for example the wavelength of maximum emission).

The above-described detector element allows the site of absorption of a radiation quantum within the conversion arrangement to be detected by means of the spectrum or the wavelength of the light emission generated. This may be used in particular in a PET apparatus to improve imaging quality by determining depth of interaction (DOI). An advantageous feature thereof is that the necessary discrimination between the light emissions with regard to their spectral characteristics is possible with relatively little effort but at the same time with a high level of accuracy.

According to a preferred embodiment of the detector element, the conversion arrangement comprises two or more discrete components, which each consist of a different material, wherein each of the above-mentioned materials reacts to the absorption of a radiation quantum with a light emission of an individual spectral composition different from the other materials. It is thus possible, on the basis of the spectral characteristics of a light emission detected outside the photodetector arrangement, to conclude in which material or in which component of the conversion arrangement the light emission was produced. The site of radiation absorption may thus be determined in accordance with the geometric division of the conversion arrangement into different components.

Where a conversion arrangement is of multi-part construction, as described above, of different materials, the emission maxima of the light emissions caused by a radiation quantum in the various materials are preferably more than 20 nm, particularly preferably more than 50 nm apart. Such a spacing of emission maxima allows relatively reliable discrimination between the different light emissions.

Moreover, the various materials of the above-described multi-part conversion arrangement are preferably so selected that each material exhibits a low absorptive capacity in the principal spectral range of the light emissions of the other materials. The light generated in the event of absorption of a radiation quantum in one of the materials may therefore pass through the other materials with relatively little attenuation. This makes it possible to arrange the photodetector arrangement outside the conversion unit, such that it is affected as little as possible by the external radiation to be detected.

According to another embodiment of the conversion arrangement, the latter comprises a material with continuously variable emission characteristics. In this case, the site of origin of a light emission may be assigned not only to discrete regions of the conversion arrangement but theoretically precisely to a point or to an area (of identical emission characteristics) within the conversion arrangement. The assignment accuracy depends in practice on the technical distinguishability of the light emissions produced at various sites. A material with continuously variable emission characteristics may for example be produced by continuously varying doping of a base material. It is also feasible to vary continuously other physical variables or parameters within the material which influence light emission (e.g. an electrical or magnetic field; the material density; the crystal structure etc.).

The photodetector arrangement may in principle be arranged at one or more positions relative to the conversion arrangement, in order to allow detection of light emissions. Preferably, however, the photodetector arrangement is arranged downstream of the conversion arrangement relative to the direction of incidence of the radiation quanta to be detected. In this case, the radiation quanta impinge first of all on the conversion arrangement, where they should be absorbed as fully as possible. The radiation quanta therefore do not impinge or impinge only minimally on the photodetector arrangement and thus cause minimum disturbance thereto. On the other hand, it is also advantageous for the photodetector arrangement not to influence or attenuate the radiation to be detected.

A photodetector arrangement with the desired ability to discriminate between spectral characteristics of a light emission may take various forms. Preferably, the photodetector arrangement comprises at least two photosensors. In general, it will comprise the same number of photosensors as there are types of light emission (i.e. sites in the conversion arrangement) to be discriminated between. The photosensors may each exhibit a different spectral sensitivity, which may be achieved for example by the material properties (doping etc.) thereof. In addition, filters with different spectral conductivities may be arranged upstream of the photosensors, wherein in this case the photosensors may themselves all have the same spectral sensitivity. Furthermore, the photosensors may be arranged next to one another or one behind the other relative to the direction of incidence of the radiation quanta to be detected or the direction of radiation of the light emissions.

In a preferred embodiment of a photodetector arrangement with at least two photosensors, the latter are arranged one behind the other relative to the direction of radiation of the light emissions, such that the (as yet unabsorbed) photons of a light emission pass through them timewise one after another. The above-mentioned photosensors are additionally connected individually to an evaluator unit, which is set up so as to determine spectral characteristics of a light emission from the distribution of signal detection over the two photosensors. The latter is possible because of the fact that photons of different wavelengths exhibit a different absorption probability per unit length, such that they are absorbed with different probabilities in the individual photosensors. With this method of detection, the photosensors may have the same spectral sensitivity, i.e. may consist of the same material, for example.

In another possible embodiment of a photodetector arrangement, the latter comprises an optical system and at least two photosensors, wherein the optical system is set up so as to guide light emissions coming from the conversion arrangement to different photosensors, depending on wavelength. The photosensors themselves may then be of similar construction, since spectral discrimination between the light emissions is effected by the optical system.

The invention additionally relates to a device for generating images by means of the detection of gamma quanta. The device may be in particular a PET apparatus, with which gamma quanta from the process of annihilation of a positron with an electron are detected in order to determine the distribution of a radionuclide in the body. The stated device comprises at least one detector element of the above-described type, that is to say having a conversion arrangement for converting gamma quanta into light emissions whose spectral composition depends on their site of origin, and having a photodetector arrangement for detection and spectral discrimination between the stated light emissions. Furthermore, the device comprises an evaluation unit which is set up so as to take account of the detection site of a gamma quantum within a detector element in the reconstruction of an image. Typically, the device comprises a plurality of detector elements distributed for example in the manner of an array over a cylindrically curved surface, such that the response of a particular detector element gives rise to a two-dimensional spatial resolution. The additional spatial resolution possible within the responding detector element due to the emission spectrum then relates to the third spatial dimension.

Finally, the invention also relates to a method of detecting radiation quanta, in particular gamma quanta, which comprises the following steps:

a) Conversion of a gamma quantum into a light emission, wherein the spectral composition of the light emission depends on the conversion site. This means in particular that there are at least two different sites, at which conversion of a gamma quantum results in light emissions of different spectral compositions.

b) Detection of the above-mentioned light emissions, wherein these are simultaneously discriminated between with regard to their spectral characteristics.

The method allows detection of a gamma quantum and simultaneous determination of its absorption site on the basis of the spectral characteristics of the light emission produced. As has been explained in relation to the detector element and the device, such a method in particular allows the production of PET apparatuses with improved imaging quality.

The invention will be further described with reference to examples of embodiment shown in the drawings to which, however, the invention is not restricted. In the Figures.

The invention is explained below with reference to exemplary embodiments and on the basis of application in a PET (Positron Emission Tomography) apparatus, although it is not limited to this application. The same reference numerals are used in the Figures for similar components.

Figure 1:
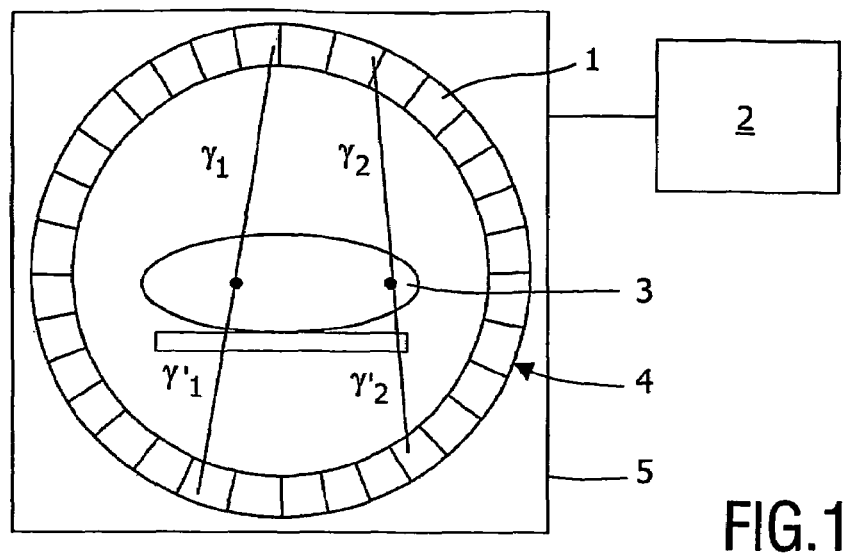
FIG. 1 is a schematic representation of the trajectories of two γ pairs in a PET apparatus according to the invention.

FIG. 1 is a schematic, cross-sectional representation of the fundamental components of a PET apparatus. The part 5 of the apparatus recording measured data comprises a detector ring 4 consisting of individual gamma radiation detector elements 1, which are connected to a schematically illustrated evaluator unit 2 (e.g. a microcomputer). A patient 3 is positioned on a bed along the central axis of the detector ring 4. A radioisotope injected into the body of the patient decays radioactively therein, emitting positrons. Each positron undergoes annihilation together with an electron in the vicinity of its site of origin, wherein a pair of gamma quanta of equal energy levels (approx. 511 keV) arises with virtually exactly opposing lines of flight. FIG. 1 shows two such representative annihilation processes in the body 3, which generate the gamma quanta pairs $\gamma_1$ and $\gamma'_1$, and $\gamma_2$ and $\gamma'_2$ respectively. The gamma quanta of a pair are detected virtually simultaneously by different detector elements 1 of the detector ring 4, whereby the trajectory of the gamma pair may be calculated. The three-dimensional image of the distribution of the radionuclide in the body 3 may then be calculated by means of known tomographic reconstruction methods.

The detector elements 1 comprise a conversion material conventionally several centimeters thick for converting the gamma quanta into an emission of visible light. In more recent PET detectors, a large number of relatively small scintillator crystals (conversion elements) are used instead of a small number of large curved crystals (see FIG. 1). For gamma pairs $\gamma_2, \gamma'_2$ arising further away from the central axis of the detector ring 4, it may then be the case that the gamma quanta pass through one of the conversion elements and only interact in a second or subsequent one. Since the detectors used today cannot determine the "depth of interaction" in a conversion element at which conversion of a gamma quantum has taken place, calculation of gamma trajectories away from the central axis is subject to a relatively high level of inaccuracy. This leads in turn to problems in reconstructing the three-dimensional image in peripheral regions of the patient.

In order to counter this problem, the structure of the detector elements 1 explained below with reference to various examples of embodiment is proposed, with which the depth of interaction of a gamma quantum may be established. In addition, it is of course intended that the detector elements should as usual supply information about the time and energy level of a detected gamma quantum.

Figure 2:
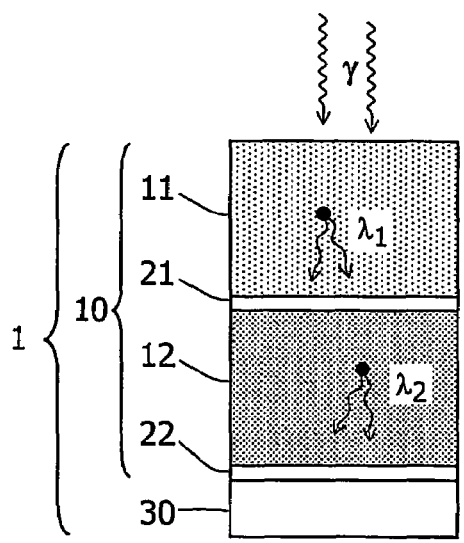
FIG. 2 shows a detector element according to the invention with two conversion units of different material.

FIG. 2 is a schematic representation of the structure of a first embodiment of a detector element 1 according to the invention, as may be used in a PET apparatus according to FIG. 1. The detector element 1 has a multilayer structure, which consists of the following components listed in turn in the direction of incidence of the gamma radiation $\gamma$:

a) a conversion arrangement 10 having:
   a first conversion unit (scintillation crystal) 11;
   an (optional) mechanical and/or optical connecting layer 21, for example an optical adhesive or grease;
   a second conversion unit (scintillation crystal) 12;
   a further (optional) connecting layer 22;
b) a photodetector arrangement 30 for detecting visible light, wherein possible embodiments of the photodetector arrangement 30 will be explained in more detail below with reference to FIGS. 5 to 9.

An essential feature of the detector element 1 is that the first conversion unit 11 and the second conversion unit 12 are so constructed that they emit visible light at different wavelengths $\lambda_1$ or $\lambda_2$ on absorption of a gamma quantum $\gamma$. More precisely, the wavelength distribution or the spectrum of the light quanta emitted on absorption of a gamma quantum is different in the two crystals 11 and 12. Furthermore, the light emissions from the photodetector arrangement 30 are not only detected with regard to their time and the energy contained therein but are also discriminated between with regard to their wavelength $\lambda_1$ or $\lambda_2$. The photodetector arrangement 30 may therefore distinguish on the basis of the wavelength of a light emission, from which conversion unit (11 or 12) the light emission originates. This in turn allows the desired conclusion to be drawn as to the depth of interaction of the gamma quantum $\gamma$ in the detector element 1.

The scintillation crystals 11 and 12 respectively may consist of the same base material, which is doped differently to achieve the desired different emission characteristics. Likewise, however, the scintillation crystals 11 and 12 respectively may also consist of completely different materials. The only important factor is that the emission spectra of the two crystals 11, 12 on absorption of a gamma quantum are as different as possible, in order to enable discrimination between the two crystals. It is also advantageous for the light quanta $\lambda_1$ generated in the upper crystal 11 to be able to pass through the lower crystal 12 with as little attenuation (absorption) as possible, such that they may be detected with a good signal-to-noise ratio in the photodetector arrangement 30.

Suitable conversion materials with emission maxima at wavelengths which are as different as possible may be selected in particular from the list of the following materials, wherein the wavelength of maximum emission is indicated in each case in brackets:
   YAG (550 nm),
   BGO (480 nm),
   GSO (440 nm),
   LSO (420 nm),
   NaI:Tl (410 nm),
   LuAP (365 nm).

It goes without saying that other criteria, such as for instance lumen output, should also be taken into account when selecting the materials. A preferred material combination is therefore for example GSO and NaI:Tl.

Figure 3:
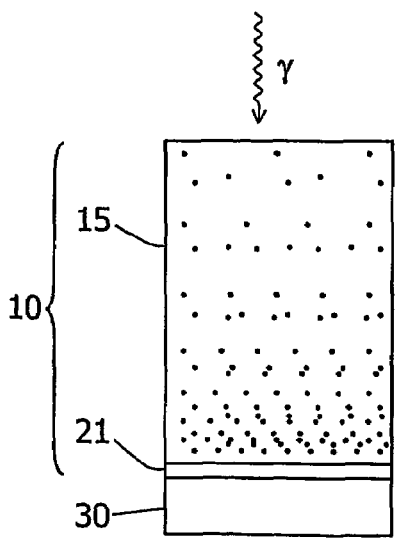
FIG. 3 shows a detector element according to the invention with a continuously variable conversion unit.

FIG. 3 shows an alternative structure for a detector element in which a one-piece conversion unit 10 is arranged on a photodetector arrangement 30 via a connecting layer 21. The composition and/or doping of the scintillation layer 10 varies in the direction of incidence of the gamma radiationy in such a way that the absorption of a gamma quantum at different depths leads to light emissions of different spectral composition. The ideally constant variation of the emission spectra within the conversion layer 10 therefore allows relatively precise determination of the depth of interaction, which is not limited, as in FIG. 2, to discrimination between (two) discrete regions.

Figure 4:
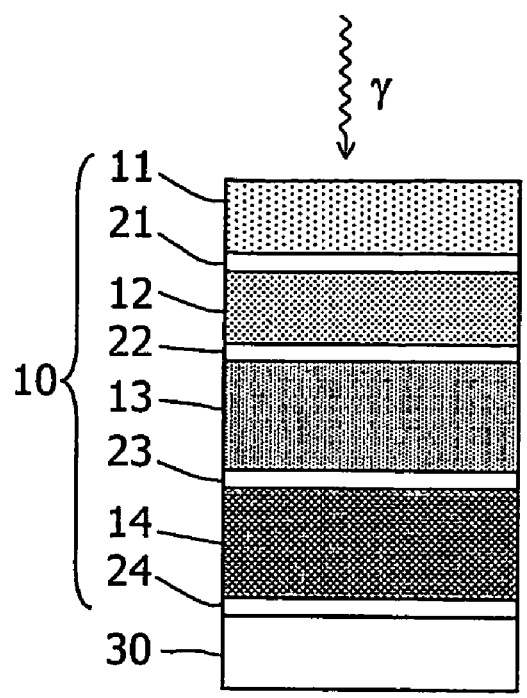
FIG. 4 shows a detector element according to the invention with four conversion units of different material.

FIG. 4 shows a further development of the arrangement of FIG. 2, wherein a sequence of four different scintillation crystals 11, 12, 13 and 14 is provided over the photodetector arrangement 30. The various components are again coupled mechanically and optically optionally be suitable connecting layers 21, 22, 23 and 24. If all four scintillation crystals 11-14 have differing emission spectra (and absorb each other's emissions as little as possible), the depth of interaction may be determined precisely with such an arrangement down to one of four different regions. Depending on the requirements of the underlying application, the scintillation crystals 11-14 may exhibit identical or different thicknesses. In addition, it is obvious that such a multilayer structure may in principle also be achieved with other numbers of layers.

FIGS. 5 to 9 show various possible embodiments of the photodetector arrangement 30, indicated previously only in general terms. The conversion arrangement 10 is illustrated in FIGS. 5 to 8, by way of example only in the two-part version according to FIG. 2, wherein, however, it goes without saying that the continuous or multi-part arrangement of FIG. 3 or FIG. 4 respectively or any other desired construction of the conversion arrangement 10 could also be provided. The number of different photosensors in the photodetector arrangements 30 illustrated may be adapted to correspond to the number of depths of interaction (number of scintillation crystals) to be discriminated between.

Figure 5:
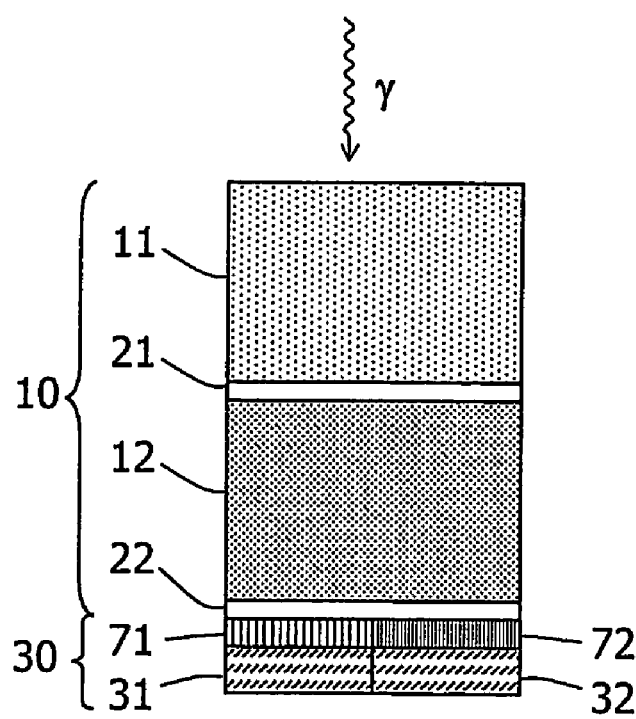
FIG. 5 shows a detector element according to the invention with two photosensors arranged next to one another and spectral filters connected upstream.

In FIG. 5, the photodetector arrangement 30 comprises two photosensors 31 and 32, wherein color filters 71 and 72 respectively with different spectral conducting behavior are in each case arranged between the photosensors 31, 32 and the conversion arrangement 10. The filters in each case allow only light from one of the two conversion units 11 or 12 to pass through to the photosensor 31 or 32 respectively. Therefore, for example, a response by the photosensor 31 may suggest absorption of a gamma quantum γ in the first conversion unit 11 and a response by the photosensor 32 may suggest absorption of a gamma quantum in the second conversion unit 12. The photosensors themselves may be of similar construction, since their different spectral behavior is achieved by the filters 71 or 72 respectively.

Figure 6:
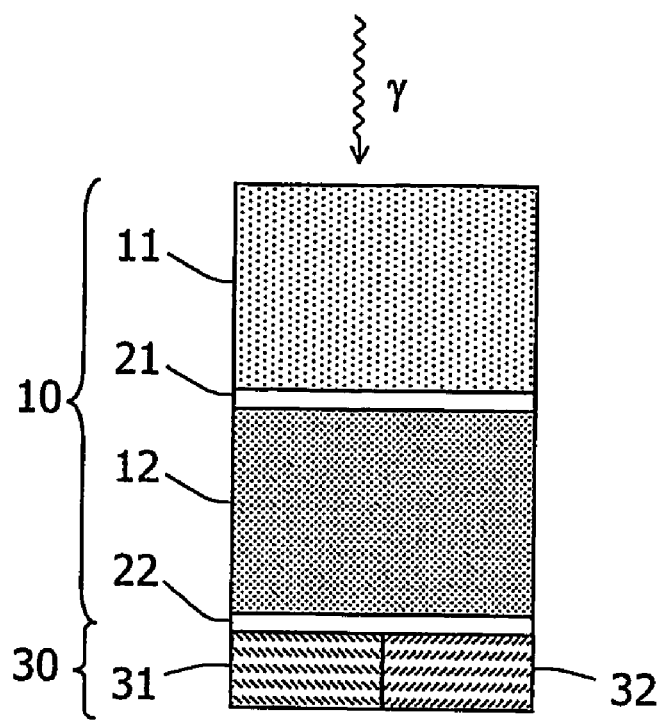
FIG. 6 shows a detector element according to the invention with two photosensors of different spectral sensitivity arranged next to one another.

FIG. 6 shows a detector element modified relative to FIG. 5, in which the photodetector arrangement 30 consists of two photosensors 31 and 32 of differing spectral sensitivity arranged next to one another when viewed in the direction of incidence of the gamma quanta γ.

Figure 7:
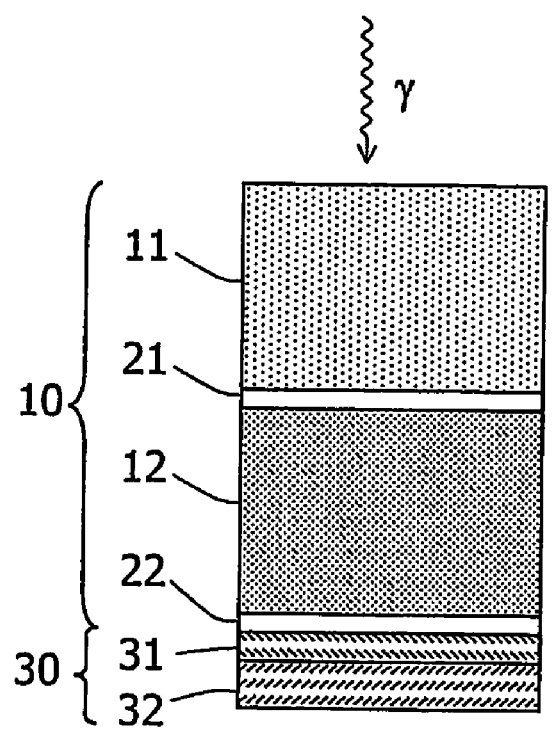
FIG. 7 shows a detector element according to the invention with two photosensors arranged one behind the other.

FIG. 7 shows an embodiment of the photodetector arrangement 30 in which two photosensors 31 and 32 are arranged one behind the other when viewed in the direction of incidence of the gamma radiation. The photosensors 31, 32 may be photodiode layers in particular. The photosensors 31, 32 may comprise different spectral sensitivities, as in FIG. 6, or they may also have the same spectral sensitivity. In this case, the spectral discrimination between light emissions is based on the fact that photons of different wavelengths have different absorption probabilities per unit length. For example, it may be the case statistically that short-wave photons are absorbed with higher probability in deeper layers than longer-wave photons. A light pulse with maximum emission at shorter wavelengths would therefore be more strongly detected in the lower photosensor 32 than in the upper photosensor 31 and vice versa. Discrimination between the light pulses according to their site of origin (conversion unit 11 or 12) is thus possible using statistical methods. The advantage of such an arrangement is that only a very small number of photons are lost to detection, such that a good signal-to-noise ratio may be achieved.

Figure 8:
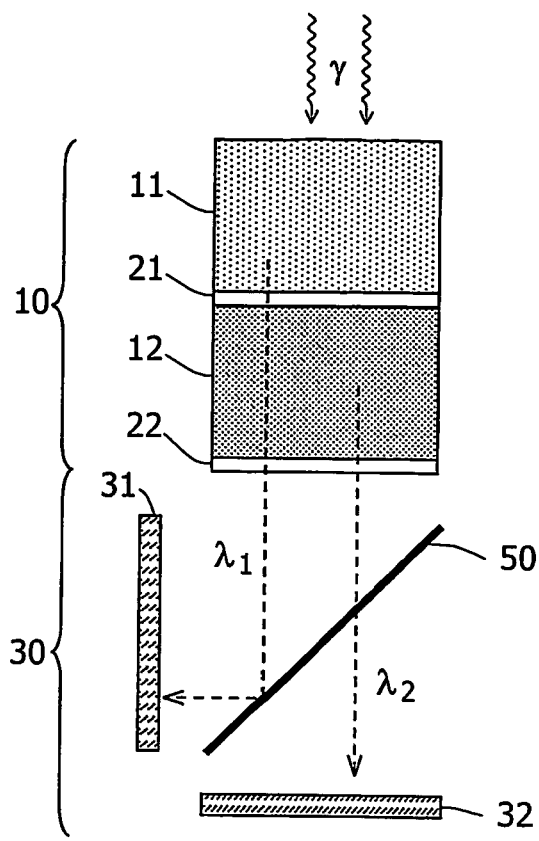
FIG. 8 shows a detector element according to the invention with a wavelength-dependent mirror.

FIG. 8 shows an embodiment in which the light leaving the conversion arrangement 10 impinges on a wavelength-dependent mirror 50, for example a multilayer dielectric mirror. The mirror 50 reflects light of a first wavelength $\lambda_1$, such that it impinges on a first photosensor 31, while light of another wavelength $\lambda_2$ may pass through the mirror 50 and impinges behind the mirror on a second photosensor 32. Light emissions from the various conversion units 11, 12 may thus be directed onto different photosensors 31, 32 by means of the mirror 50. The photosensors 31, 32 themselves may be of similar design.

Figure 9:
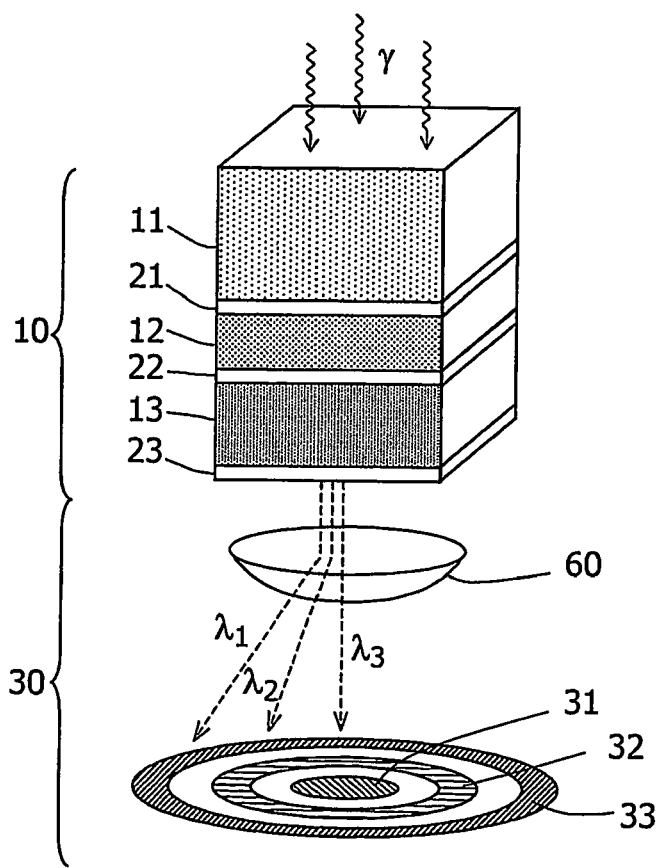
FIG. 9 shows a detector element according to the invention with a lens for directing light in wavelength-dependent manner onto photosensors.

FIG. 9 shows another embodiment of a detector element according to the invention, in which wavelength-dependent direction of the light emissions onto different photosensors likewise occurs. The conversion arrangement 10 takes the form of a three-part structure with three conversion layers 11, 12 and 13 with different emission characteristics. A lens 60 is arranged downstream of the conversion arrangement 10 in the direction of gamma radiation γ, which lens 60 deflects light emissions from the conversion arrangement to differing degrees depending on the wavelength $\lambda_1$, $\lambda_2$, $\lambda_3$ thereof. A lens system or another optical element, such as a prism for instance, effecting refraction or diffraction in wavelength-dependent manner could be provided instead of the lens 60. The photodetector arrangement 30 additionally comprises concentrically arranged photosensors 31, 32 and 33 (for example photodiodes, photomultiplier tubes or channels inside a photomultiplier tube), which are each arranged along the ring surface, onto which the principal wavelength of a light emission of a particular crystal 11, 12 or 13 is directed. Additional means, such as for example optical waveguides, may optionally also be provided between the conversion arrangement 10 and the optical element 60.

The embodiments described by way of example in the Figures all have the advantage that no further disturbing components are located between the scintillator crystals and the incident gamma radiation. In particular, all the photosensors are arranged downstream of the scintillators and thus screened from the radiant flux. While retaining the conventional time and energy resolution of the detector element, the embodiments additionally allow discrete or optionally also continuous determination of the depth of interaction, wherein a very good signal-to-noise ratio may be achieved, depending on the embodiment.

The invention claimed is:

1. A method of detecting radiation quanta, comprising the steps:
conversion of a quantum into a light emission, wherein the spectral composition of the light emission depends on the conversion site in a conversion material whose doping continuously varies in a direction of incidence of a radiation quantum; and
detection of the light emissions with discrimination between its spectral characteristics.

2. The method of claim 1, wherein a spectral composition of the light emission depends on a conversion depth of the quantum in the conversion material.

3. The method of claim 1, further including optically guiding the light emission to different photosensors that detect light with different spectral characteristics, depending on a wavelength of the light emission.

4. The method of claim 1, wherein the light emission includes emission of light in the visible light spectrum.

5. The method of claim 1, further including filtering the light emission to allow passage only of light with energy that accords to a spectral sensitivity of a photosensor receiving the light emission.

6. The method of claim 1, further including energy discriminating between light emissions using at least two different photosensors that exhibit differing spectral sensitivities.

7. The method of claim 1, the material has continuously variable emission characteristics that vary in accordance with the continuously varying doping.

8. An imaging apparatus comprising:
a detector comprising:
a means for converting radiation into light emissions of different wavelengths depending on the conversion site, wherein the means for converting comprises a conversion material with a doping percentage that is continuously increasing along one of the dimensions of the conversion material;

a means for detecting the light emissions of different wavelengths such as to determine the conversion site of each light emission detected; and an evaluator for reconstructing an image based on the location of each conversion site of each light emission detected.

9. The imaging apparatus of claim 8 wherein the means for converting radiation into light emissions of different wavelengths depending on the conversion site comprises two or more discrete layers of different conversion materials.

10. The imaging apparatus of claim 8 wherein the means for detecting the light emissions of different wavelengths such as to determine the conversion site of each light emission detected comprises two or more different photodetectors, each for detecting light emissions of a particular wavelength.

11. The imaging apparatus of claim 10 further comprising an optical element which directs light emissions to different photodetectors depending on wavelength of the light emissions.

12. The imaging apparatus of claim 10 further comprising one or more filter elements that determine which light emissions will be detected by each of the photodetectors.

13. The imaging apparatus of claim 8, wherein the imaging apparatus is a medical imaging device.

14. A radiation sensitive detector, comprising:

a converter that converts gamma radiation into a light emission, wherein the converter includes a material with a doping that continuously varies in a direction parallel to the direction of incident gamma radiation and the light emission is indicative of the energy of the gamma radiation; and a photodetector that detects light emission from the converter and energy-discriminates the gamma radiation based on the light emission.

15. The radiation sensitive detector of claim 14, wherein a spectral composition of the light emission depends on a conversion site of the gamma radiation in a conversion material of the converter.

16. The radiation sensitive detector of claim 14, wherein the material has continuously variable emission characteristics.

17. The radiation sensitive detector of claim 14, wherein the converter includes at least two different materials that generate light emissions of different compositions upon absorption of the gamma radiation.

18. The radiation sensitive detector of claim 14, wherein the photodetector includes at least two photosensors that exhibit differing spectral sensitivities.

19. The radiation sensitive detector of claim 18, wherein the at least two photosensors are arranged one behind the other in relation to the direction of light emission and are connected to an evaluator unit, wherein the evaluator unit is set up so as to determine spectral characteristics of the light emission from the distribution of signal detection over the two photosensors.

20. The radiation sensitive detector of claim 14, further including:

at least a second photodetector; and a multilayer dielectric mirror that selectively directs the light emission to one of the at least one photodetectors based upon spectral characteristics of the light emission.

* * * * *